United States Patent [19]
Lemanski

[11] 3,918,243
[45] Nov. 11, 1975

[54] BEAN PULLER

[76] Inventor: Bernard Lemanski, 308 S. Silver, Bad Axe, Mich. 48413

[22] Filed: Aug. 22, 1974

[21] Appl. No.: 499,768

[52] U.S. Cl. ..................... 56/229; 56/14.7; 171/64
[51] Int. Cl.² .................. A01D 55/00; A01D 45/22
[58] Field of Search .......... 56/229, 119, 14.7, 14.9, 56/15.8, 15.9; 171/7, 64

[56] References Cited
UNITED STATES PATENTS

| | | |
|---|---|---|
| 1,893,863 | 1/1933 | Kerns .................................. 56/229 |
| 2,614,376 | 10/1952 | Madsen ............................... 56/229 |
| 2,709,326 | 5/1955 | Coombe .............................. 56/229 |
| 3,421,303 | 1/1969 | Kammerzell ......................... 56/229 |

*Primary Examiner*—Russell R. Kinsey

[57] ABSTRACT

A tractor mounted bean puller assembly in which a plurality of individual knife and windrower assemblies are supported in a side-by-side arrangement by a linkage suspension which enables the forward and rearward ends of the assemblies independently to be raised and lowered to elevate bodily the apparatus for transportation or to adjust the elevation and inclination of the operative elements of the unit.

8 Claims, 5 Drawing Figures

3,918,243

BEAN PULLER

SUMMARY OF THE INVENTION

In a bean puller in accordance with the present invention, a plurality of individual support frame assemblies, each mounting a knife and a windrower, are provided with a ground-engaging support wheel assembly mounted at the rearward end of each support frame. The support frames are mounted in side-by-side relationship with the forward ends of all support frames commonly pivotally connected to a transversely extending rock shaft. This front rock shaft is in turn suspended by a support link from a crank fixed to another transversely extending rock shaft which is in turn supported upon a fixed frame adapted to be mounted upon a tractor. A drive crank on the second rock shaft is operable by a hydraulic motor to raise or lower the front ends of all of the individual support frames in unison, the rearward ends of the frames normally being supported by their individual ground-engaging wheels. Raising or lowering the forward ends of the support frames by raising or lowering the common rock shaft adjusts the elevation and inclination of the forward ends of the operative elements, i.e., The knives and windrowers. A control link pivotally coupled between the common rock shaft and the fixed frame constrains forward and rearward movement of the support frames relative to the fixed frame.

The rearward end of each support frame is pivotally coupled by a link to a second crank which is in turn fixedly mounted upon a second rock shaft on the fixed frame. A sliding pivotal connection between the crank and link accommodates some lost motion between these two elements, a fixed stop on the link engaging a pivoted collar on the crank to accommodate elevating of the rearward end of the associated support frame and enabling a controlled lowering movement until the support frame wheel engages the ground. A spring mounted on the link is engageable to limit upward movement of the rearward end of the support frame as the unit is driven across uneven ground. The rearward ends of the individual support frames are thus independently movable within the range of movement accommodated by the lost motion and spring elements. A hydraulic motor-driven crank is employed to operate the second or rear rock shaft. The entire unit may be elevated clear of the ground for transport purposes by simultaneously raising both the front and rear ends of the support frames.

Other objects and features of the invention will become apparent by reference to the following specification and to the drawings.

IN THE DRAWINGS

Figure 2:
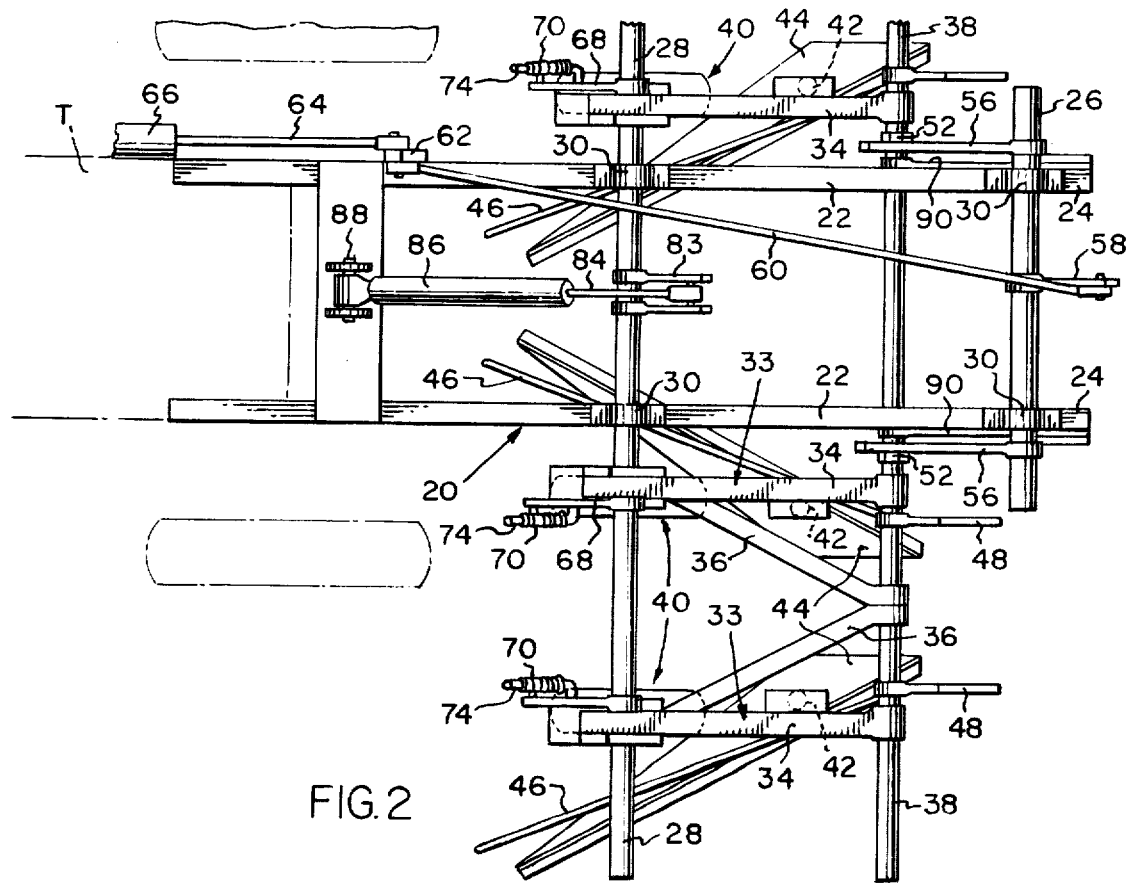
FIG. 2 is a top plan view of the bean puller of FIG. 1 with the left-hand portion of the structure broken away. The portion which is broken away is essentially a mirror image of the right-hand portion of the apparatus.

The disclosed embodiment of the invention includes a rigid frame designated generally 20 which is adapted to be fixedly mounted upon and project from the forward end of a tractor T. The exact form of structure for mounting fixed frame 20 upon tractor T will vary widely between various makes and models of tractors and thus has not been shown in detail. However, the mounting will be designed so as to fixedly support from the tractor frame a pair of elongate rigid frame members 22 which project substantially horizontally forwardly from the front end of the tractor in spaced parallel relationship as best shown in FIG. 2.

At the forward end of each of main frame members 22, a downwardly projecting support arm 24 is fixedly secured. Suitable cross bracing, not shown, may be employed if desired to rigidify the two assemblies of frame members 22 and 24 into the rigid fixed frame assembly 20.

Transversely extending front and rear rock shafts 26 and 28 are rotatably supported upon main frame members 22 as by pillow blocks 30 with rock shafts 26 and 28 being rotatable about parallel horizontal axes normal to the extent of frame members 22 and to the direction of travel of the tractor T. Rock shafts 26 and 28 function, through front and rear linkage systems to be described below, to support a support frame assembly designated generally 32 beneath fixed frame 20 in a manner such that the front and rear ends of the support frame assembly 32 may be independently adjusted vertically to tilt the working elements of the bean puller to accommodate for undulations in the field being worked.

Support frame assembly 32 includes a plurality of individual support frames 33, each including a main support frame member 34 and a bracing member 36, both of members 34 and 36 being rotatably journaled at their forward end upon a transversely extending rock shaft 38 which commonly supports all of the individual support frames 33 in spaced side-by-side relationship, the spacing corresponding to the row spacing of beans to be harvested. A ground-engaging wheel assembly designated generally 40 is mounted at the rearward end of each of the individual support frames 33. Each support frame 33 is constructed with a downwardly extending standard 42 upon which is mounted a conventional knife 44 employed to sever the stalks of the bean plants, the cutting edge of the knife being inclined obliquely with respect to the direction of travel of the apparatus. A rod-like windrower 46 is supported upon each individual support frame as by frame members 48 and 50, the windrower deflecting severed plants into windrows.

Rock shaft 38 is supported from front rock shaft 26 by a pair of main support links 52 which are pivotally coupled to rock shaft 38 at their lower ends and pivotally connected as at 54 to the distal ends of a pair of crank arms 56 fixedly secured to rock shaft 26. Rock shaft 26 is rotatable by means of a drive crank 58 fixedly secured to rock shaft 26 and coupled to a drive link 60 which is in turn coupled via a link 62 pivotally mounted on main frame 20 to an extended piston rod 64 of a hydraulic motor 66 which, in this particular case, is mounted upon the tractor T. It is believed apparent that extension or retraction of piston rod 64 is transmitted via links 62 and 60 to crank 58 to rotate rock shaft 26 about its longitudinal axis, rotation of rock shaft 26 being transmitted via cranks 56 and front support links 52 to raise or lower the front end of support frame assembly 32 by raising or lowering the common rock shaft 38.

Although the forward ends of all support frames 33 are commonly coupled to rock shafts 38 and thus move up and down in unison with shaft 38, the rearward ends of the individual support frames 33 are independently suspended and thus capable of independent movement upwardly and downwardly in accordance with variations in ground elevation as encountered by the individual support wheel assemblies 40.

Each support frame 33 is suspended from rear rock shaft 28 by a linkage system which includes a crank 68 fixedly mounted upon and projecting radially from rock shaft 28. At its outer or distal end, each crank 68 pivotally supports an elongate collar 70 mounted upon crank 68 as by a pivot pin 72. Each collar 70 slidably receives an elongate link 74 which is pivotally coupled at its lower end by a pivot 76 to its individual support frame 33. A stop collar 78 adjustably fixed, as by a set screw, not shown, on link 74 above collar 70 is engageable by the collar 70 to limit downward movement of link 74 relative to collar 70. The rearward end of the support frame 33 to which the link 74 is coupled is gravitationally urged downwardly, and counterclockwise movement of crank 68 about the axis of rock shaft 28 as viewed in FIG. 1 will gravitationally lower the rearward end of the associated support frame until the ground-engaging wheel 40 engages the ground. Further downward movement of collar 70 occasioned by continued counterclockwise rotation of crank 68 merely causes collar 70 to slide downwardly along link 74 away from contact with stop collar 78. Clockwise movement of crank 68 as viewed in FIG. 1 will drive collar 70 upwardly into contact with stop collar 78 and further clockwise movement of the crank 68 will lift link 74 to elevate the rearward end of the associated support frame assembly.

Figure 4:
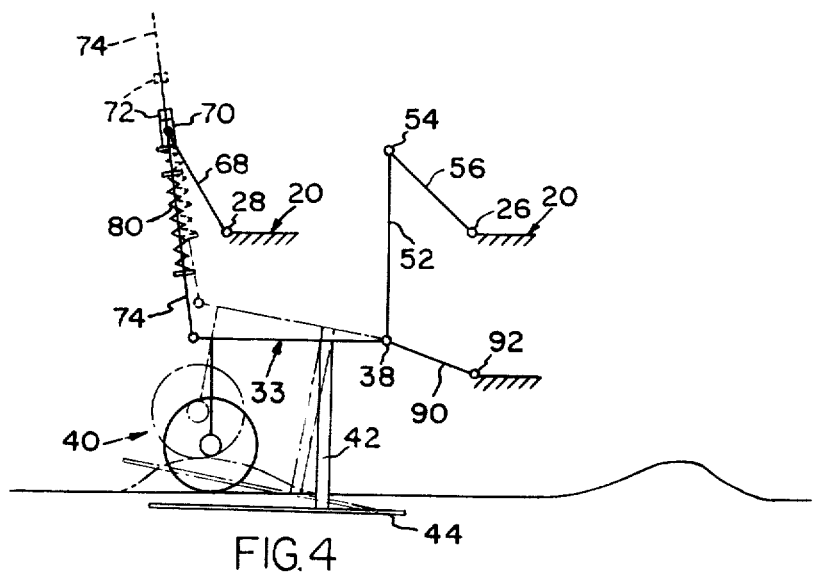

In normal operation, stop collar 78 is located on link 74 to engage collar 70 when its associated support frame is supported on level ground by wheel assembly 40. Assuming that the forward end of the support frame 33 is supported so that the associated knife 44 is in a horizontal position with the rearward end of the support frame supported by its ground-engaging wheel, the contact between collars 70 and 78 will maintain the knife horizontal even if the wheel assembly encounters a hole or depression in the ground (see full-line view of FIG. 5), while the sliding coupling between link 74 and collar 70 will permit the rearward end of the support frame to move upwardly freely if the wheel encounters a bump (see broken-line view of FIG. 4).

To resiliently cushion upward travel of the rearward end of the support frame during operation over bumpy ground, a coil spring 80 is mounted on each link rod 74 with its lower end seated against a fixed flange 82 and with the upper end of the relaxed spring spaced somewhat downwardly along link 74 from the lower side of collar 70. This arrangement permits an unrestricted initial upward movement of limited extent as the wheel travels over a bump, after which further upward movement drives the upper end of spring 80 against the lower side of collar 70 to resiliently resist further upward movement.

Rock shaft 28 is rotatable by a drive crank 83 pivotally coupled to the piston rod 84 of a second hydraulic motor 86, motor 86 being pivotally mounted upon main frame 20 as at 88.

Constraining links 90 are pivotally connected to fixed frame members 24 as at 92 and to rock shaft 38 to constrain generally horizontal movement of support frame assembly 32, which would otherwise be free to swing forwardly and rearwardly relative to the fixed frame.

Figure 1:
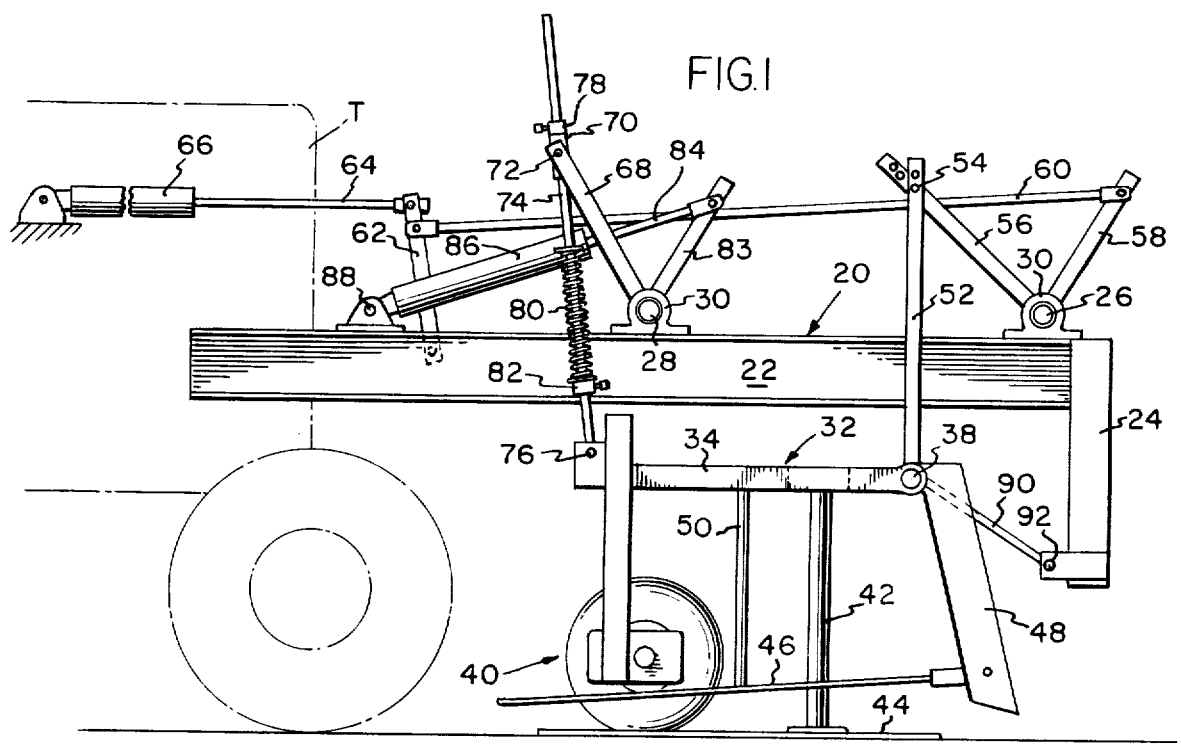
FIG. 1 is a side elevational view of a bean puller embodying the present invention.

In operation, to commence a harvesting operation in the field, motor 86 is actuated to lower the rearward ends of the support frames by rotating drive crank 83, rock shaft 28 and crank 68 in a counterclockwise direction as viewed in FIG. 1 until support of the rearward end of the support frames is assumed by the individual ground-engaging wheel assemblieis 40. Motor 66 is then actuated to retract its piston rod to swing cranks 58, rock shaft 26 and crank 56 in a counterclockwise direction as viewed in FIG. 1 to lower rock shaft 38 to a position such that the knives 44 are disposed in a horizontal position or in a position where the forward end of the knife is inclined slightly downwardly and forwardly. The knives customarily are set to travel slightly beneath the surface of the field to sever the bean stalks below ground level. This position of the apparatus is shown in the full line views of FIGS. 4, 5 and 6. The transverse spacing of the individual support frame and their knives is matched to the row spacing of the bean field, and by driving the tractor forwardly each knife operates on an individual row of beans to sever the beans with windrowers 46 deflecting the severed plants to one side of the path of support wheels 40.

Figure 5:
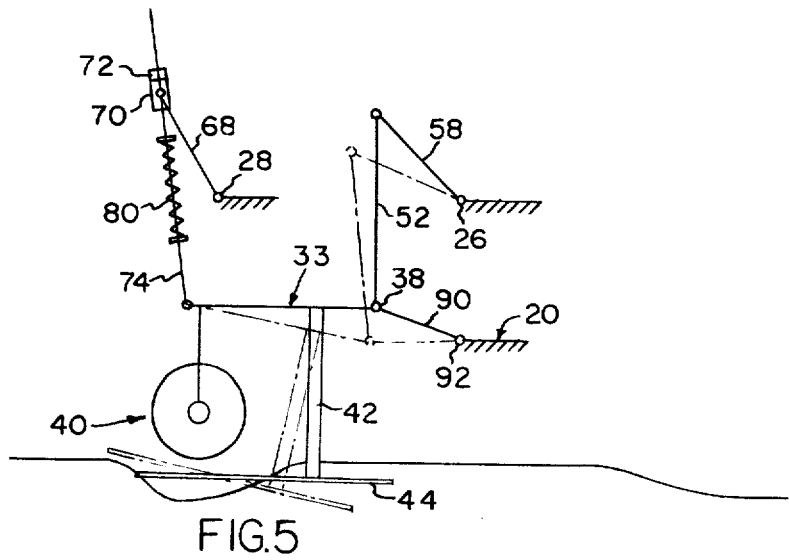

As explained above, the suspension of the rearward end of the individual support frame is such that the position of the knife remains unaffected if its support wheel 40 should encounter a hole or depression in the ground (see full line view of FIG. 5). When one of the wheels 40 encounters a bump, the rearward end of that support frame can swing upwardly to permit the wheel to pass freely over the bump (see broken line view of FIG. 4) without affecting any of the other individual support frames 33. Because the forward end of the knife is located substantially below the axis of rock shaft 38, the upward pivotal movement of the individual support frame 33 about the axis of rock shaft 38 does not affect the elevation of the forward end of the knife upon upward movement of the rearward end of the support frame. The angle of inclination of the knives is readily adjusted by raising or lowering rock shaft 38 by appropriate actuation of motor 66.

Figure 3:
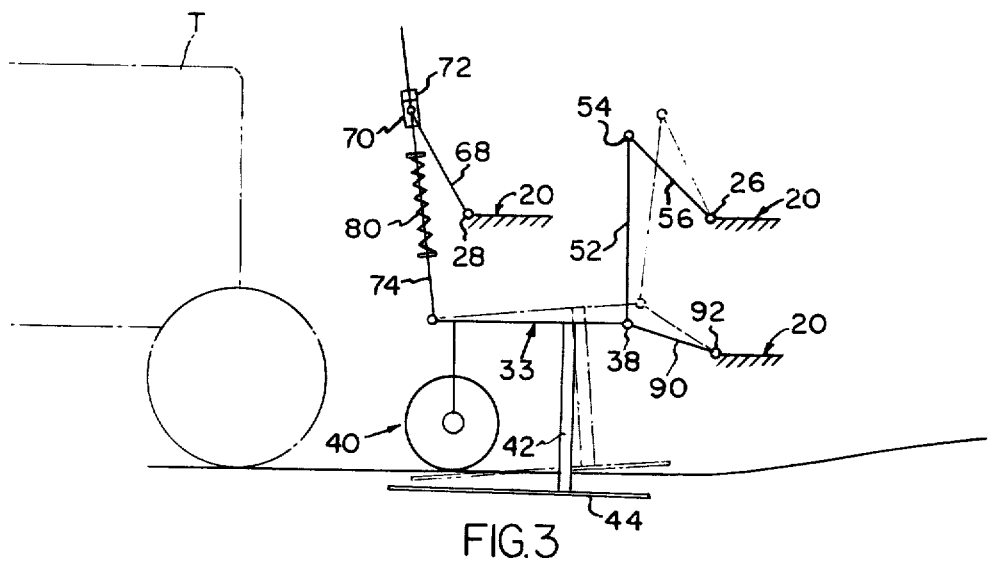
FIGS. 3, 4 and 5 are schematic diagrams of a side elevation of the apparatus, with certain parts omitted for clarity, showing operational features of the apparatus.

The apparatus projects forwardly beyond its primary point of support at wheels 40 and thus the leading ends of the knives 44 will encounter a change or undulation in ground level while the wheels 40 are still traveling over level ground. Where a general rise in elevation is encountered (see FIG. 3) it is necessary to elevate the forward end of the knives 40 to maintain a constant depth below the ground surface. This is accomplished by actuating motor 66 to rotate rock shaft 26 and cranks 56 in a clockwise direction as viewed in FIG. 3 to shift the parts from the full line position of FIG. 3 to the broken line position as the forward ends of knives 40 advance into the rising ground.

Similarly, if the knives are advanced onto downwardly sloping ground (FIG. 5) motor 66 is actuated in the reverse direction to drive cranks 56 in a counterclockwise direction to shift the parts from the full line position of FIG. 5 to the broken line position.

When it is desired to transport the apparatus, both of motors 66 and 86 may be actuated to elevate both the forward and rearward ends of the support frame so that the knives and windrowers are elevated clear of the ground for travel to and from the field.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

I claim:

1. A bean puller comprising an elongate fixed frame, transversely extending front and rear rock shafts mounted on said frame for pivotal movement about parallel horizontal axes normal to the longitudinal extent of said fixed frame, a windrower support frame, a root cutting knife supported by said support shaft, front and rear link means respectively mounted upon said front and rear rock shafts and coupled to said support frame to suspend said support frame beneath said fixed frame, said front link means being pivotally coupled to said support frame adjacent the front end thereof and being operable upon pivotal movement of said front rock shaft to raise or lower the front end of said support frame relative to said fixed frame, said second mentioned link means being pivotally coupled to said support frame adjacent the rearward end thereof and being operable upon pivotal movement of said second rock shaft to raise or lower the rearward end of said support frame relative to said fixed frame, independently operable power means for independently pivoting said first and said second rock shafts, and third link means constraining movement of said support frame relative to said fixed frame.

2. A bean puller as defined in claim 1 wherein each of said front and rear link means comprises a crank arm fixed to the rock shaft and a support link pivotally connected at one end to said crank and pivotally connected at its other end to said support frame, and said third link means comprises a third link pivotally coupled at one end to said fixed frame and pivotally coupled at its other end to said support frame.

3. A bean puller as defined in claim 1 further comprising a plurality of said support frames, a common rock shaft extending parallel to said first and second rock shafts commonly coupling the forward ends of said support frames to said front link means with said support frames being disposed in spaced side-by-side relationship to each other along said common rock shaft, said second link means comprising a plurality of second link assemblies, each of said second link assemblies coupling one of said support frames to said rear rock shaft.

4. A bean puller as defined in claim 3 wherein each of said second link assemblies comprises a crank fixed on said rear rock shaft, a link member pivotally coupled to said crank and the support frame, and lost motion means accommodating upward movement of the rearward end of said support frame relative to said crank.

5. A bean puller as defined in claim 4 further comprising ground engaging wheel means for supporting the rearward end of said support frame.

6. A bean puller as defined in claim 4 wherein said lost motion means comprises a collar pivotally mounted on said crank slidably receiving said link member, and stop means mounted on said link member above said collar for limiting downward movement of said link member through said collar.

7. A bean puller as defined in claim 6 further comprising spring means on said link member for resiliently cushioning upward movement of said link member through said collar.

8. A bean puller as defined in claim 1 wherein said fixed frame comprises a pair of spaced parallel horizontally extending frame members adapted to be fixedly mounted upon and project forwardly from a powered vehicle such as a tractor.

* * * * *